Patented Apr. 17, 1928.

1,666,423

UNITED STATES PATENT OFFICE.

ROBERT B. LAMMENS, OF LOS ANGELES, CALIFORNIA.

PROCESS OF STAINING AND HARDENING CONCRETE AND THE LIKE.

No Drawing. Application filed April 2, 1923. Serial No. 629,533.

The present invention consists in impregnating certain materials, such as Portland cement mixtures, lime mortars, gypsum plasters, magnesite composition or products made of such materials in part or in whole, natural stones, such as limestones, sandstones, marble, tufa, etc., or in fact any similar material that is more or less porous; with certain chemicals or substances or combinations of the same, in solutions, which penetrate the cement, for instance, to an appreciable depth. And the invention also consists in the use of more than one such penetrating solutions, one solution being introduced after another, and the reaction between the two solutions producing a colored, insoluble and permanent precipitate to an appreciable depth, that colors the cement or impart a high degree of hardness, or both.

In explaining my process, I shall refer to its application to cement or concrete, because that application is typical of application to other substances, and because the process is used most largely on cement or concrete.

In the various attempts and proposals that have been made to produce color by chemical precipitation in concrete, for instance, there have been several practical difficulties, each of which alone has made such methods of little or no practical value. I will explain briefly what these difficulties are, in order that a clear and full understanding may be had of my process and its advantages.

(1) It has been proposed for instance to introduce into concrete a solution of some chemical that is supposed to react with the lime content of the concrete and thereby produce a colored precipitate. The difficulty here is that no two pieces or areas of concrete will contain the same amount of lime to be worked upon. For instance in a cement floor, part of it may be laid and cured correctly and have all its lime component practically used up in the chemical process of setting and hardening; and another part of the same floor may contain a greater percentage of uncombined lime, due to one or several causes in laying, or setting, or hardening of the concrete. But when such floors are treated with a lime reacting coloring chemical, the results obtained are so variegated as to be of little practical value.

On the other hand, old cement floors, or any cement product not containing any free lime (due the fact that the carbon dioxide of the air has transformed the lime into calcium carbonate) are of course very little or not at all affected by such lime reacting chemical solution.

And what I say of the variation of lime content also applies to a situation where any attempt is made to put into the concrete mixture some special reactive substance, such as iron filings on which the coloring chemicals may react.

(2) The presence of free alkaline salts in Portland cement and concrete mixtures, consisting mainly of soluble calcium salts due to imperfect setting and hardening of the concrete, or the salts of other metals introduced by the use of hard waters, makes it practically impossible to obtain any fast color by reaction with the lime content; because the coloring is immediately reacted upon by the alkaline substances with the usual production of precipitates that are either soluble in water and thus washed out, or are not fast and fade away through secondary chemical action.

(3) Then further, in all such application of coloring solutions to concrete or other substances, whether those coloring solutions are single, are intended to react upon something in the concrete, or are intended merely to give color without any reaction, it has been found impossible to introduce the coloring matter substantially beyond the surface. This is particularly true of the salts of the heavy metals such as those of copper, iron, chromium, manganese, nickel, zinc, etc. By what appears to be a dialytic action, the liquid solvent will penetrate the concrete, leaving the dissolved coloring matter behind on the surface; and the coloring matter is then rapidly worn away, particularly when applied to concrete that is subjected to any amount of wear, as floors for instance.

It is within the scope of the objects of my invention to overcome each of these difficulties; that is, to obviate the various and uncontrollable reaction of substances in the concrete; to obviate the effect of destructive alkaline materials; and to attain a substantial penetration of the solutions and of the coloring and hardening matter itself. I will now give illustrative procedures.

For instance, the object to be colored is first treated on its surface with a 10% water solution of magnesium fluosilicate acidulated with 10% of hydrochloric acid. This treatment removes the impurities and laitance on the surface of the object and thus opens the pores, and also neutralizes the free alkali and the free lime by forming metallic chlorides and a calcium fluosilicate. After allowing the substance (concrete for instance) to dry, I apply for instance a water solution of tannic acid, the concentration of this solution varying according to the richness of coloring desired. This solution also carries about 2% of sugar; that is, the solution is an aqueous solution containing sugar about 2% and a varying amount of tannic acid.

This penetrates to a great depth, and deposits tannic acid in the pores of the concrete, but without communicating any color to it. After the object is again allowed to dry, I apply a concentrated water solution of bichromate of potassium, also containing about 2% of sugar. This last solution also penetrates to approximately the same depth in the concrete, and, coming into contact with the tannic acid previously there deposited, reacts to form an olive green, permanent and insoluble precipitate throughout the pores.

Or, as another illustration, I proceed by treating the object first with the acidified magnesium fluosilicate solution; then after allowing it to dry I impregnate it with a water solution of chloride or sulphate of manganese containing 2% of sugar. This solution does not in itself impart any coloring. Then after drying again, I apply a water solution of potassium hydroxide containing also 2% of sugar. As the second solution comes into contact with the deposited manganese salt, a reaction occurs to form a fast brown and insoluble color precipitate as deeply into the pores as the solutions have penetrated.

In each of these cases it will be seen that the final color is produced exclusively by reaction between the two introduced solutions. Therefore the color production can be and is accurately controlled to produce the desired richness of color and to produce uniform coloring results. This uniformity of result cannot be affected by the alkaline or lime content of the concrete; because, in the first place, I may use two reaction solutions upon neither of which the lime or alkaline substances will react; and because, in the second place, I prefer in every instance to remove even a slight possibility of lime or alkaline reaction by neutralizing or rendering inactive those substances in the beginning.

The penetrating qualities of the solutions are due, in the instances given above, to the sugar used. As I have before intimated, I have found that a solution of coloring matter will not ordinarily penetrate a porous body in such a manner as to carry the coloring matter into the pores. A sort of dialytic action keeps the color at the surface. But by the use of sugar or of picric acid, I find that I can carry these coloring or reaction solutions into the concrete in such a way as to carry the dissolved substances deeply into the pores. While I have not exhaustively tried all possible substances for the purpose of this penetration, and I therefore do not wish to be specifically limited to the particular substances herein named, I have found that either sugar or picric acid will act very effectually to carry the coloring or reagent matter into the concrete to a considerable penetration. Whether I use one or the other of these penetration substances depends somewhat upon the coloring or reagent substances in the solution, the final color desired, etc.

At present, my only explanation of the actions of these penetrating substances is to say that they exert a substantial osmotic pressure when combined with the coloring or reagent solution. It is well known that certain soluble substances exert a greater osmotic pressure than others; and it is further known that, for any given substance, sugar for instance, the effective osmotic pressure may vary according as different liquids are used as solvents. Accordingly, I may intelligently explain the action in my process by saying that the penetration substances (sugar or picric acid, for instance,) are substances that, when put in water or other solution with the coloring or reagent substances, will exert a relatively high osmotic pressure to carry those substances into the concrete. In the case of using sugar, as far as I have been able to ascertain, there is no chemical reaction between the sugar and the various coloring or reagent substances that are used; the solution is simply a water solution of a coloring or reagent substance and also of sugar. But the addition of the sugar to the solution not only creates a condition wherein the sugar itself penetrates the concrete, but the coloring or reagent substance also penetrates the concrete along with the sugar.

The same is generally true of picric acid; the acid solution itself has the penetrating power; but in using picric acid, in at least some cases, there is a chemical reaction between the picric acid and the coloring or reagent substance; and then this product, in the solution, has the power of penetration. Examples of the use of sugar solutions have been given above, and as an example of the use of picric acid I cite the following:

I treat the object first with a mixture of picric and the sulphuric acid. This removes the laitance, opens the pores, and reacts on the alkaline substances and the free lime, to neutralize them and render them non-reactive as regards any substance which is subsequently introduced. This mixture penetrates deeply but does not produce any color, as the sulphates and picrates thus formed are colorless. Then I treat the object with a water solution containing ferrous sulphate and picric acid; the percentage of the ferrous sulphate depending upon the richness of color desired and picric acid being used as a saturated solution. This produces a penetrating light brown stain; as the picric acid seems to react on the ferrous sulphate, in the solution, to produce a picramic acid. This color may, if desired, be left as it is; but by subsequently treating with a solution containing picric acid and chromium potassium sulphate, the latter solution upon coming into contact with the precipitate already in the pores, produces a fast orange-red insoluble coloring. Picric acid is more soluble in alcohol than in water; and in practice I sometimes use alcohol instead of water as a solvent.

In any one of these instances, hereinabove given, the solid colored precipitate formed in the pores, and their penetration to a considerable depth (in practice a half inch or more is attainable) have a very marked hardening effect on concrete or other porous objects. The wearing qualities of a floor, for instance, are thereby greatly increased; and, due to the depth to which the coloring is applied, the color is practically everlasting.

From the foregoing description it will appear clearly that one part of my invention is the use of such penetrating substances as will insure penetration of the coloring or reagent substances to a considerable depth. This process of penetration may be applied generally to coloring or hardening solutions, regardless of what happens to those solutions after they are introduced into the porous body. But I prefer (and this is the other main feature of my invention) to produce the final color by reaction between two reagents introduced by solution, to obtain uniform and accurately controllable results. And for this purpose I render the alkaline and lime content of the body incapable of reacting on the reagents or their product. In this way I produce a fast color, uniform and controllable as to richness, not variegated by side reactions; and with the coloring matter occupying and filling the pores to a considerable depth and acting as a densifier and hardener.

Having described a preferred form of my invention, I claim:

1. In a process for treating concrete or the like, introducing a solution of one coloring reagent, and then introducing a solution of another coloring reagent to react with the first mentioned reagent to produce the desired color; each solution also containing in addition to its coloring re-agent a substance capable of producing a relatively high osmotic pressure.

2. In a process for treating concrete or the like, introducing a solution of one coloring reagent, and then introducing a solution of another coloring reagent to react with the first mentioned reagent to produce the desired color; each solution also containing a substance capable of producing a relatively high osmotic pressure; each solution containing in addition to its coloring re-agent picric acid about two percent.

3. In a process for treating concrete or the like, treating with a reagent to neutralize the alkaline and lime content, then introducing successively two solutions containing substances that react on each other to produce a precipitate in the pores, each solution containing, in addition to its reaction substance, a substance capable of producing a relatively high osmotic pressure to introduce each solution deeply into the pores.

In witness that I claim the foregoing I have hereunto subscribed my name this 24th day of March 1923.

ROBERT B. LAMMENS.